United States Patent
Wang et al.

(10) Patent No.: US 11,043,043 B2
(45) Date of Patent: Jun. 22, 2021

(54) DYNAMIC DRIVING RANGE PREDICTION FOR ELECTRIC VEHICLES

(71) Applicant: INTERNATIONAL BUSINESS MACHINES CORPORATION, Armonk, NY (US)

(72) Inventors: Zhi Hu Wang, Beijing (CN); Shiwan Zhao, Beijing (CN); Changhua Sun, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/194,303

(22) Filed: Nov. 17, 2018

(65) Prior Publication Data

US 2020/0160619 A1 May 21, 2020

(51) Int. Cl.
*B60L 58/12* (2019.01)
*B60L 58/24* (2019.01)
(Continued)

(52) U.S. Cl.
CPC .............. *G07C 5/004* (2013.01); *B60L 58/12* (2019.02); *B60L 58/24* (2019.02); *G06N 5/046* (2013.01)

(58) Field of Classification Search
CPC ........ F17C 13/08; F17C 13/083; F17C 13/02; F17C 1/002; F17C 13/025; F17C 2201/054; F17C 2223/0123; F17C 2221/035; F17C 2250/0491; F17C 2221/011; F17C 2221/014; F17C 2260/015; F17C 2221/012; F17C 2201/035; F17C 2201/0109; F17C 2223/035; F17C 2250/0465; F17C 2221/033; F17C 2205/0157;
(Continued)

(56) References Cited

U.S. PATENT DOCUMENTS

| 8,676,482 B2 | 3/2014 | Uchida |
| 2011/0082621 A1 | 4/2011 | Berkobin et al. |

(Continued)

FOREIGN PATENT DOCUMENTS

| CN | 104986043 | 10/2015 |
| CN | 105253024 | 9/2017 |

OTHER PUBLICATIONS

Chang, "The State of Charge Estimating Methods for Battery: A Review", Hindawi Publishing Corporation, ISRN Applied Mathematics, Jul. 2013, vol. 2013, Article ID 953792, pp. 1-8.
(Continued)

*Primary Examiner* — Peter D Nolan
*Assistant Examiner* — Ashley L Redhead, Jr.
(74) *Attorney, Agent, or Firm* — Tutunjian & Bitetto, P.C.; Joseph Petrokaitis

(57) ABSTRACT

Systems and methods for estimating battery-powered driving distance for a vehicle, including training a relative model for a battery using input historical battery temperature data and historical battery-external factors, and predicting a future battery temperature based on the relative model and one or more of current or future battery-external factors. A battery power capacity is determined using the predicted future battery temperature and input manufacturer specifications for the battery, and a remaining battery powered driving distance is calculated based on input vehicle power consumption data and the determined battery power capacity.

20 Claims, 7 Drawing Sheets

(51) Int. Cl.
*G07C 5/00* (2006.01)
*G06N 5/04* (2006.01)

(58) Field of Classification Search
CPC ...... F17C 2201/0119; F17C 2205/0107; F17C 2270/0173; F17C 2250/043; F17C 2270/0105; F17C 2270/011; F17C 2270/0171; F17C 2205/013; G01D 11/30
See application file for complete search history.

(56) References Cited

U.S. PATENT DOCUMENTS

| | | | |
|---|---|---|---|
| 2011/0112710 A1* | 5/2011 | Meyer-Ebeling | B60W 40/12 701/22 |
| 2012/0038314 A1* | 2/2012 | Stewart | B60L 53/65 320/103 |
| 2016/0137090 A1 | 5/2016 | Nam et al. | |
| 2018/0086222 A1* | 3/2018 | Juang | G06N 3/0454 |
| 2018/0118033 A1 | 5/2018 | Lu et al. | |

OTHER PUBLICATIONS

Ferreira et al., "Dynamic Range Prediction for an Electric Vehicle", EVS27 International Electric Vehicle Symposium & Exhibition, Nov. 2013, pp. 1-13.

* cited by examiner

DYNAMIC DRIVING RANGE PREDICTION FOR ELECTRIC VEHICLES

BACKGROUND

Technical Field

The present invention generally relates to contextual charging driving range prediction for electric vehicles, and more particularly to maximizing electric vehicle driving range by adjusting vehicle functions based on a contextual charging driving range prediction.

Description of the Related Art

A plug-in electric vehicle (PEV) is any motor vehicle that can be recharged from an external source of electricity, such as wall sockets, and the electricity stored in the rechargeable battery packs drives or contributes to drive the wheels. PEV is a subset of electric vehicles that includes all-electric or battery electric vehicles (BEVs), plug-in hybrid vehicles (PHEVs), and electric vehicle conversions of hybrid electric vehicles and conventional internal combustion engine vehicles.

SUMMARY

In accordance with an embodiment of the present invention, a method is provided for estimating battery-powered driving distance for a vehicle, including training a relative model for a battery using input historical battery temperature data and historical battery-external factors, and predicting a future battery temperature based on the relative model and one or more of current or future battery-external factors. A battery power capacity is determined using the predicted future battery temperature and input manufacturer specifications for the battery, and a remaining battery powered driving distance is calculated based on input vehicle power consumption data and the determined battery power capacity.

In accordance with another embodiment of the present invention, a system is provided for estimating battery-powered driving distance for a vehicle. The system includes a processor device operatively coupled to a memory, and the processor is configured to train, using a model trainer, a relative model for a battery using input historical battery temperature data and historical battery-external factors and predict a future battery temperature based on the relative model and one or more of current or future battery-external factors. A battery power capacity is determined using the predicted future battery temperature and input manufacturer specifications for the battery, and a remaining battery powered driving distance is calculated, using an endurance mileage calculator, based on input vehicle power consumption data and the determined battery power capacity.

In accordance with another embodiment of the present invention, a non-transitory computer-readable storage medium including a computer readable program is provided for estimating battery-powered driving distance for a vehicle, wherein the computer readable program when executed on a computer causes the computer to perform the steps of training a relative model for a battery using input historical battery temperature data and historical battery-external factors, and predicting a future battery temperature based on the relative model and one or more of current or future battery-external factors. A battery power capacity is determined using the predicted future battery temperature and input manufacturer specifications for the battery, and a remaining battery powered driving distance is calculated based on input vehicle power consumption data and the determined battery power capacity.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
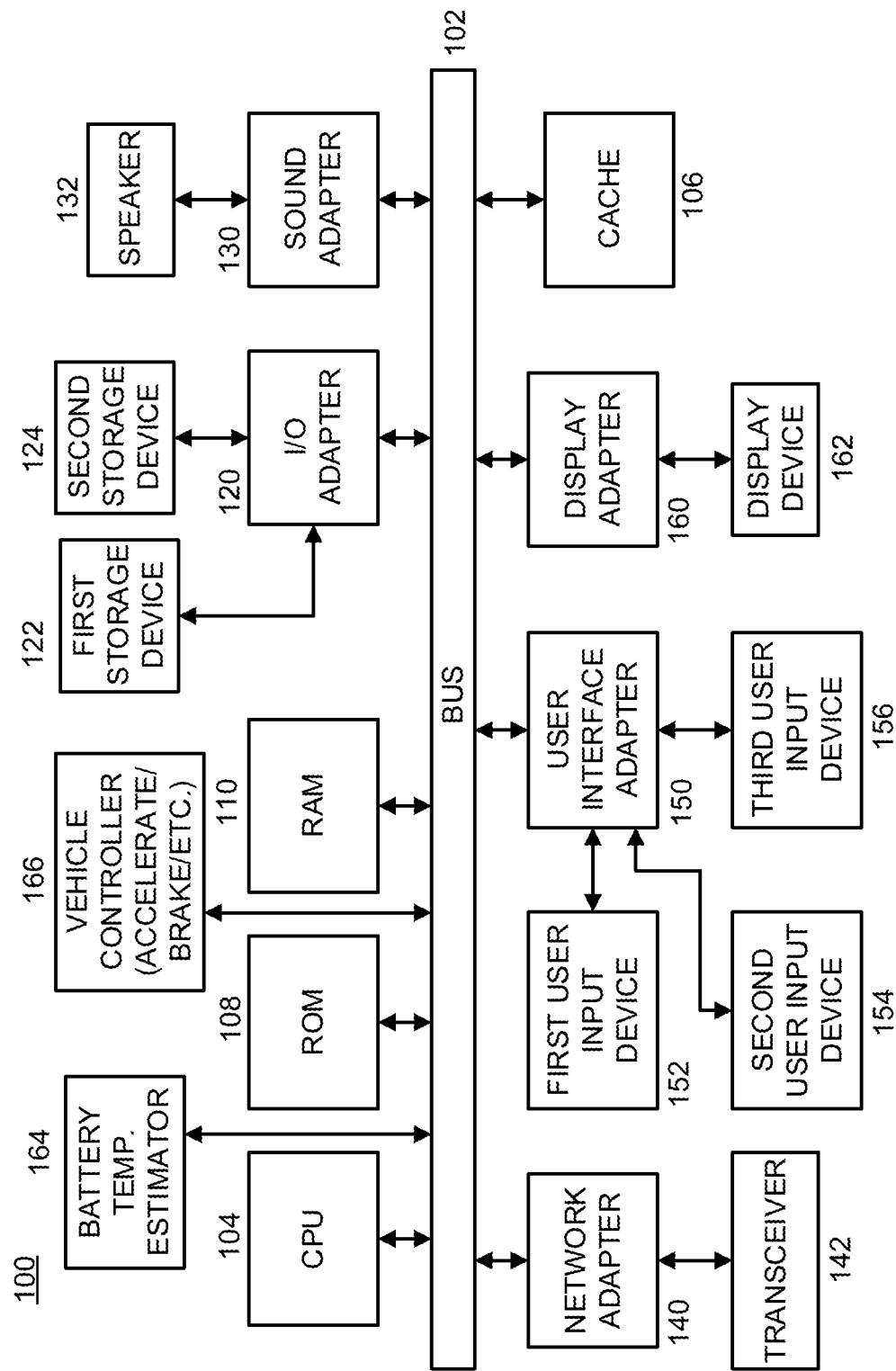
FIG. 1 is a block/flow diagram illustrating an exemplary processing system to which the present invention may be applied, in accordance with an embodiment of the present invention.

In accordance with various embodiments of the present invention, systems and methods are provided for management of behind-the meter energy storage/management systems for battery-optimized demand charge minimization.

In various embodiments, a contextual charging (e.g., endurance mileage) prediction for battery-powered driving range for a plug-in electric and/or hybrid electric vehicle (e.g., New Energy Vehicle (NEV), Battery Electric Vehicle (BEV), plug-in hybrid vehicles (PHEVs), etc. in accordance with aspects of the present invention. Embodiments of the present invention can include a system and method for accurate and effective prediction of contextual charging (e.g., endurance mileage) for any of a plurality of types of electric vehicles. Conventional systems and methods cannot adequately directly predict charging power capacity, or an accurate driving range for battery-powered driving for electric vehicles.

Aspects of the present invention can accurately predict power capacity and a driving range for battery powered driving for electric vehicles by considering a plurality of factors (battery-internal and/or battery-external factors including, for example, battery internal temperatures under any of a plurality of operating modes for any of a plurality of battery types (e.g., size, capacity, number of batteries, etc.). In accordance with various embodiments of the present invention, the endurance mileage for an electric and/or hybrid electric vehicle can be determined by predicting the battery temperature at various operating conditions/modes, and utilizing the battery temperature prediction to further predict endurance mileage of new energy vehicle under the input operating conditions. In various embodiments, any of a plurality of settings/modes of the electric and/or hybrid electric vehicle can be adjusted using a real-time controller to maximize electric vehicle driving range for particular user preferences (e.g., comfort settings, acceleration settings, lighting settings, etc.) by adjusting vehicle functions based on a contextual charging driving range prediction for the electric/hybrid electric vehicle and/or the input user preferences in accordance with aspects of the present invention.

In various embodiments, the system and method can learn/build a relative model (e.g., at build time) based on, for example, historical battery temperature and external factors (e.g., weather, car mode/type, driving mode, etc.) in accordance with aspects of the present invention. At run-time, the battery temperature can be predicted based on the relative model and input factors (e.g., forecasted weather conditions, estimated driving modes, car mode), estimate the battery power capacity according to its temperature predicted, and combine vehicle power consumption (e.g., turn on/off air condition/music, lights, etc.) and predicted power capacity to estimate the endurance mileage of new energy vehicle in accordance with various embodiments of the present invention.

In various embodiments, the battery power capacity and expected endurance mileage (e.g., driving distance range) for an electric/hybrid electric vehicle can be determined based on the measured temperature of the battery rather than using only measurements/forecasts for external weather temperature. Experimental results have shown that determining endurance mileage based at least in part on the measured temperature of the battery (e.g., real-time measurements during driving) and one or more of a plurality of factors (e.g., battery-internal, battery-external, user preferences, vehicle-external, etc.) in accordance with aspects of the present invention provides more accurate results than conventional systems and methods which do not take into account internal battery temperature in attempting to predict expected endurance mileage for an electric/hybrid electric vehicle. Exemplary applications/uses to which embodiments of the present invention can be applied include, but are not limited to extending driving range distance per charge for electric and/or hybrid electric vehicles, determining appropriate charging station locations based on a determined expected endurance mileage, adjusting vehicle settings/modes responsive to user-selected preferences (e.g., air conditioner on/off, lighting on/off, etc.)

Referring now to the drawings in which like numerals represent the same or similar elements and initially to FIG. 1, an exemplary processing system 100 to which aspects of the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100. In various embodiments of the present invention, a battery temperature estimator 164 can be utilized to determine a battery internal temperature under a plurality of conditions based on a learned model. Aspects of the present invention can include a vehicle controller 166 (e.g., local or remote, manual or automatic, etc.), which can be utilized to perform various adjustments/operational functions for a vehicle (e.g., accelerate, decelerate, turn air conditioner on/off, turn lights on/off, etc.), which is described in further detail herein below.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
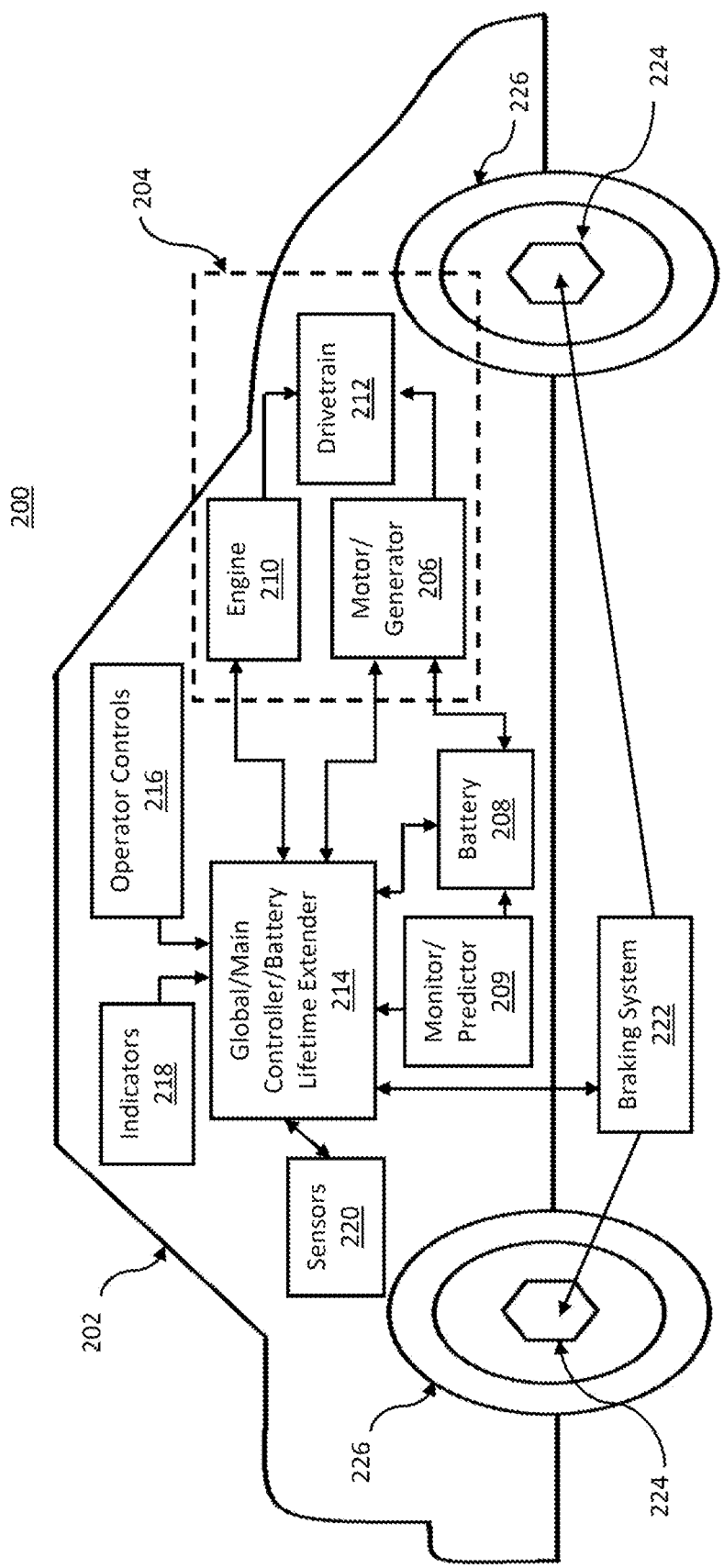
FIG. 2 is a block diagram showing an exemplary electric/hybrid electric vehicle operatively coupled to a system for maximizing electric vehicle driving range by adjusting vehicle functions based on a contextual charging driving range prediction, in accordance with an embodiment of the present invention.
Figure 5:
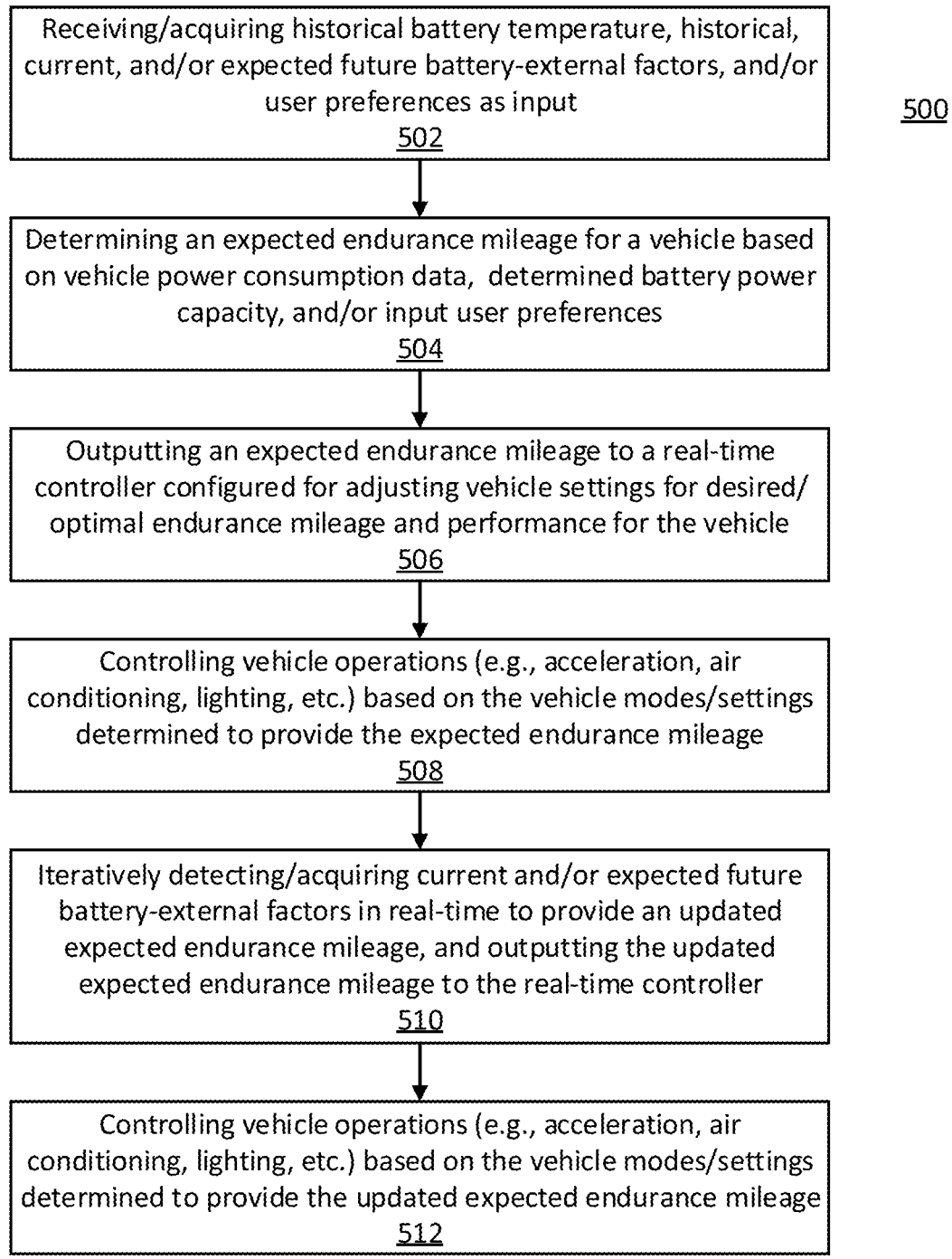
FIG. 5 is a block/flow diagram showing a method for maximizing electric vehicle driving range by adjusting vehicle functions based on a contextual charging driving range prediction for an electric/hybrid electric vehicle and/or user preferences, in accordance with an embodiment of the present invention.

Moreover, it is to be appreciated that systems 100, 200, and 500, described with respect to FIGS. 1, 2, and 5, respectively, are systems for implementing respective embodiments of the present invention. Part or all of processing system 100 can be implemented in one or more of the elements of systems 200 and/or 900, according to various embodiments of the present invention.

Figure 3:
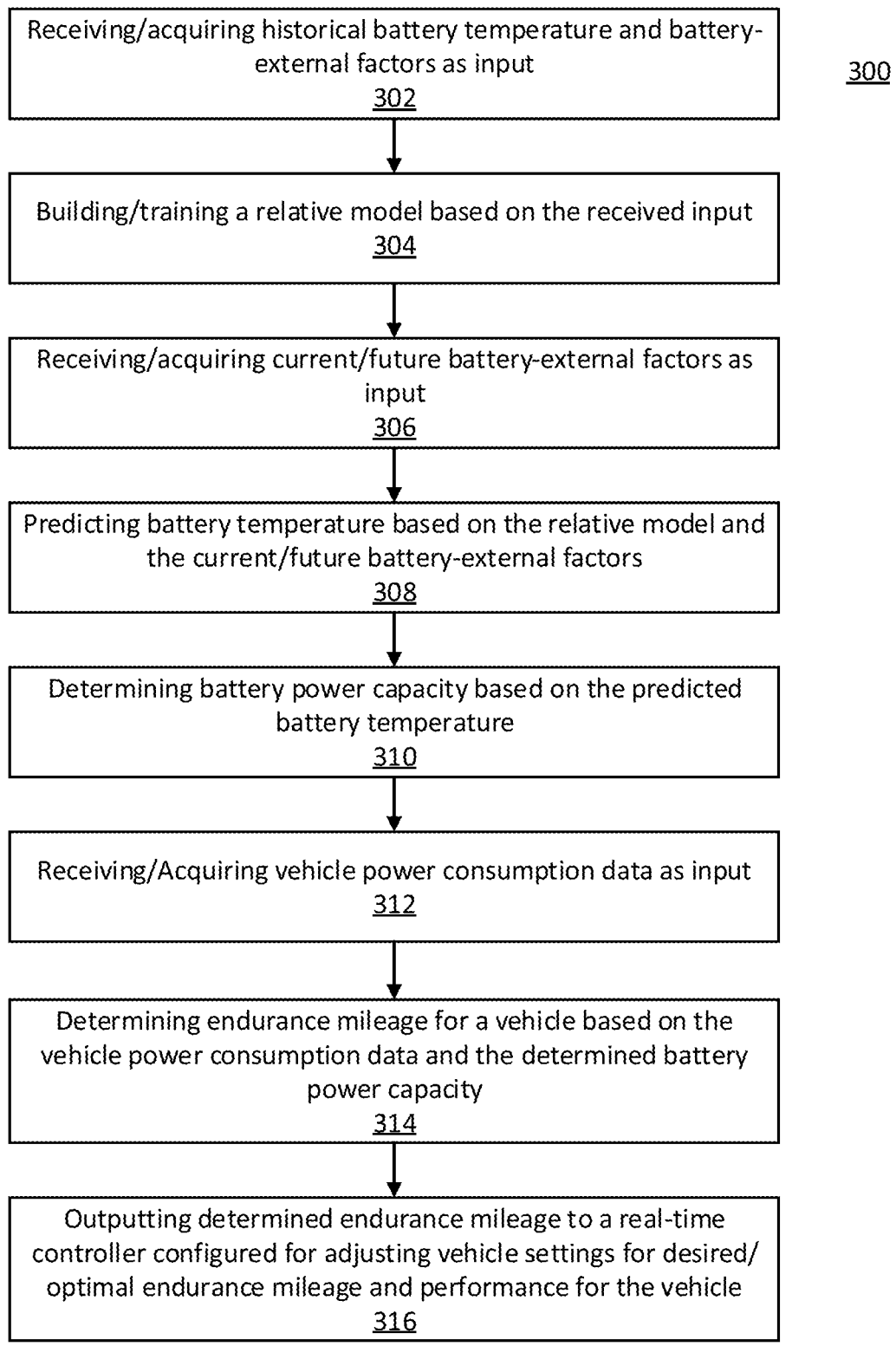
FIG. 3 is a block/flow diagram showing a method for contextual charging driving range prediction for an electric/hybrid electric vehicle, in accordance with an embodiment of the present invention.
Figure 4:
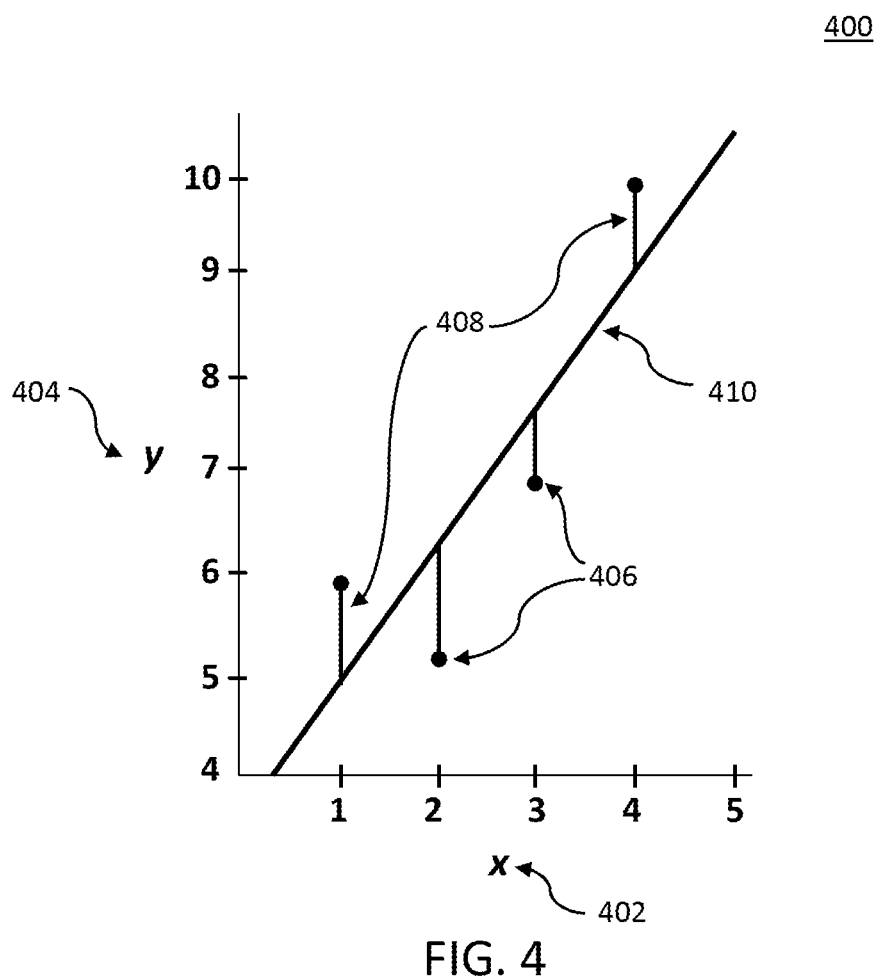
FIG. 4 is a high-level graph showing predicted battery temperature for a battery in a vehicle (e.g., electric, hybrid electric, etc.) under any of a plurality of driving modes/operating conditions, in accordance with an embodiment of the present invention.

Further, it is to be appreciated that processing system 100 can perform at least part of the methods described herein including, for example, at least part of methods 300 and 400 of FIGS. 3 and 4, respectively. Similarly, part or all of system 500 can be used to perform at least part of methods 300 and 400 of FIGS. 3 and 4, respectively, according to various embodiments of the present invention.

Referring now to FIG. 2, a block diagram 200 showing an exemplary electric/hybrid electric vehicle 202 operatively coupled to a system for maximizing electric vehicle driving range by adjusting vehicle functions based on a contextual charging expected driving range prediction is illustratively depicted in accordance with an embodiment of the present invention. In various embodiments, the global/main controller/battery lifetime extender 214 can control a plurality of vehicle functions based on the expected driving range prediction (e.g., control vehicle's powertrain or propulsion system 204 to be activated/deactivated during particular modes or conditions (e.g., when the vehicle's internal combustion engine is stopped in hybrid-electric vehicles, when the vehicle has stopped/started moving, turning on/off air conditioning, etc.). The powertrain or propulsion system 204 can include an electric machine or motor/generator 206, and/or an internal combustion engine 210, and in some embodiments, each can be selectively and operatively coupled to the vehicle's driveline or drive train 212 (e.g., to the drive shaft of the vehicle) and which can individually and/or cooperatively deliver power and torque to the drive train 212, thereby powering the vehicle 202 in accordance with aspects of the present invention. Motor/generator 206 can be operatively coupled to and selectively provide power to and/or receive power from an electrical power supply 208, such as a battery or fuel cell, which can be operatively coupled to a battery monitor/battery lifetime predictor 209 in accordance with various embodiments of the present invention.

The system 200 can include a main controller or control system 214, and one or more indicators 218 (e.g., feedback, alerts, battery performance, etc.) in accordance with various embodiments of the present invention. The controller 214 can be electrically and communicatively coupled to a user or driver operated controls or components 216 and to the indicators 218. The main controller 214 can include and/or be communicatively coupled to separate control modules which cooperatively control the operation of propulsion system of the vehicle 202 in accordance with aspects of the present invention. For example, in some embodiments, a controller 214 can include a controller of the type which is used to control an electric/hybrid electric motor/generator, and/or a controller of the type which is used to control an internal combustion engine. In one non-limiting embodiment, these controllers can be embodied within a single controller, chip, microprocessor or device. The controller 214 can determine the total amount of torque/acceleration to be provided or delivered to drive train 212 and to partition or divide the total amount of torque between motor/generator 206 and engine 210. During certain conditions (e.g., low load, idle conditions, braking conditions, etc.), the controller 214 can selectively turn off/stop the engine 210 and only provides torque to drive train 212 by use of the electric motor/generator 206.

In some embodiments, the controller 214 can determine the most efficient use of the torque providing sources (e.g., motor 206 and/or engine 210), and partitions or divides the demanded torque in a manner which balances fuel economy, vehicle performance, and user preferences while maximizing driving range distance per charge based on a plurality of factors, which will be described in further detail herein below with reference to FIGS. 3 and 4. When the demanded torque falls below a certain predetermined level (e.g., when the vehicle is idling or is being braked), the controller 214 can turn off/stop the engine 210 and can provide torque/acceleration to the drive train 212 by use of motor/generator 206 (e.g., for hybrid/electric vehicles). As described more fully and completely herein below with reference to FIGS. 3 and 4, the controller 214 can selectively activate indicators 218 and/or adjust vehicle settings/modes/acceleration/etc. based upon the operating conditions of the vehicle 202, effective to selectively notify the driver of the operational status of the powertrain 204 and/or dynamically calculated real-time endurance mileage driving range distance for the battery in the vehicle 202 in accordance with various embodiments of the present invention.

In various embodiments, the vehicle 202 can be a plug-in electric vehicle powered by the motor/generator 206, which can be an electric motor/generator unit for use in, for example, a New Energy Vehicle (NEV). The electric motor/generator 206 can be operatively coupled to the drive shaft of the vehicle 202 in a known and conventional manner. In some embodiments, the motor/generator 206 can be operatively coupled to other portions of the drive train or drive line 222 of the vehicle 202 (e.g., to one or more of the axles or differential gear units of vehicle 12), and/or to other mechanical components of vehicle 202. An electrical charge storage device 208 (e.g., battery) can supply power to the motor/generator 206 and can further be used to recover and store energy during regenerative braking events in accordance with embodiments of the present invention.

In various embodiments, driver operated controls 216 can include any of a plurality of switches, devices, controllers, and other components which accept user or driver selected inputs, thereby allowing the user or driver (or autonomous driving vehicle controller) to operate the vehicle 202 in accordance with embodiments of the present invention. In one non-limiting embodiment of the present invention, controls 216 can include without limitation a vehicle brake pedal, an accelerator/gas pedal", a vehicle shifter, a battery control/monitoring system, a speed control system, etc. The controls 216 can provide commands and/or operating data to the controller 214, which can utilize these commands or data to continuously determine expected endurance mileage and/or maximize driving distance range for particular user preferences for the electric/hybrid electric vehicle 202 in accordance with aspects of the present invention.

The vehicle 202 can further include a plurality of sensors 220 which can measure and/or acquire information pertaining to vehicle 202 and its components (e.g., battery 208, braking system 222, powertrain 204, etc.). In some embodiments of the present invention, sensors 220 include one or more vehicle speed sensors which are adapted to estimate or measure the vehicle's speed and to generate signals to the controller 244 representing the measured speed. The vehicle 202 can include a friction braking system 222 which can be communicatively coupled to the controller 214. The braking system 222 can include friction type braking members 224 (e.g., drum or disc type members), which can be actuated and/or engaged by a conventional hydraulic or electromechanical system and which act to slow and/or stop the vehicle's wheels 226 from rotating in accordance with aspects of the present invention.

In some embodiments, the indicator 218 can be one or more of audio, visual and/or vibration notification devices, which can be adapted to receive signals from the controller 214 and to generate an audible, visual, or vibrational signal to a driver of the vehicle 202, thereby notifying the driver of the active operational state of the powertrain 204, battery information, vehicle external information (e.g., weather reports, road conditions, etc.) in accordance with aspects of the present invention. In some embodiments, the indicator 218 can be a flashing light or other visual indicator which can be operatively disposed on or within the vehicle's instrument panel or dashboard and which can, for example, notify a driver when the driving range distance for the battery has fallen below a particular distance threshold, provide recommendations to extend battery-powered driving distance, etc. in accordance with aspects of the present invention. In another alternate embodiment, vibration generating devices can be placed in areas of the vehicle 202 which can readily transmit vibrations to the driver (e.g., steering column, inside the driver's seat, etc.). In various other non-limiting embodiments, any combinations of the aforementioned audible, visual, vibrational, and tactile feedback indicators can be employed in accordance with aspects of the present invention.

Referring now to FIG. 3, a block/flow diagram showing a method 300 for contextual charging driving range prediction for an electric/hybrid electric vehicle is illustratively depicted in accordance with various embodiments of the present invention.

In block 302, historical battery temperature and battery-external factors (e.g., external weather conditions, driving mode, static vehicle mode, etc.) can be received/acquired as input, and a relative model can be built/trained in block 304 using some or all of the input data from block 302 in accordance with aspects of the present invention. In an exemplary embodiment, the building of the relative model in block 304 can employ a generalized linear model (GLM) for battery temperature prediction in block 308 in accordance with aspects of the present invention.

For example, in an exemplary embodiment utilizing linear regression, given a data set $\{y_i, x_{i1}, \ldots, x_{ip}\}_{i=1}^n$ of n statistical units, a linear regression model can assume that the relationship between the dependent variable y and the p-vector of regressors x is linear. This relationship can be modeled through a disturbance term or error variable ε, which represents an unobserved random variable that adds "noise" to the linear relationship between the dependent variable and regressors. Thus in accordance with various embodiments of the present invention, the model can take the following form:

$$y_i = \beta_0 1 + \beta_1 x_{i1} + \ldots + \beta_p x_{ip} + \varepsilon_i = x_i^T \beta + \varepsilon_i, i=1, \ldots, n,$$

where $T$ denotes the transpose, so that $x_i^T \beta$ is the inner product between vectors $x_i$ and $\beta$.

In various embodiments, these n equations can be stacked together and written in matrix notation as follows:

$$y = X\beta + \varepsilon, \quad y = \begin{pmatrix} y_1 \\ y_2 \\ \vdots \\ y_n \end{pmatrix}, \quad X = \begin{pmatrix} x_1^T \\ x_2^T \\ \vdots \\ x_n^T \end{pmatrix} = \begin{pmatrix} 1 & x_{11} & \cdots & x_{1p} \\ 1 & x_{21} & \cdots & x_{2p} \\ \vdots & \vdots & \ddots & \vdots \\ 1 & x_{n1} & \cdots & x_{np} \end{pmatrix},$$

$$\beta = \begin{pmatrix} \beta_0 \\ \beta_1 \\ \beta_2 \\ \vdots \\ \beta_p \end{pmatrix}, \quad \varepsilon = \begin{pmatrix} \varepsilon_1 \\ \varepsilon_2 \\ \vdots \\ \varepsilon_n \end{pmatrix}.$$

where y represents a vector of observed values $y_i$ (i= 1, ..., n) of the variable called the regressand, endogenous variable, response variable, measured variable, criterion variable, or dependent variable. This variable can be referred to as the predicted variable, but this should not be confused with predicted values, which can be denoted as ŷ. The decision as to which variable in a data set is modeled as the dependent variable and which are modeled as the independent variables can be based on a presumption that the value of one of the variables is caused by, or directly influenced by the other variables in accordance with various embodiments of the present invention.

In various embodiments, X can be a matrix of row-vectors $x_i$ or of n-dimensional column-vectors $X_j$, which can be regressors, exogenous variables, explanatory variables, covariates, input variables, predictor variables, or independent variables in accordance with aspects of the present invention. The matrix X can be referred to as a design matrix. A constant can be included as one of the regressors. For example, in an exemplary embodiment, $x_{i0}=1$ for i= 1, ..., n. The corresponding element of β can be referred to as an intercept. The values $x_{ij}$ can represent either observed values of random variables $X_j$ or as fixed values chosen prior to observing the dependent variable. β can be a (p+1)-dimensional parameter vector, where $\beta_0$ is an intercept term (e.g, for embodiments including an intercept in the model), otherwise β can be one-dimensional in accordance with aspects of the present invention. ε can represent a vector of values $\varepsilon_i$, and this part of the model can be referred to as an error term, disturbance term, or noise. This variable can capture all other factors which influence the dependent variable y other than the regressors x. The relationship between the error term and the regressors, for example their correlation, can be an important consideration in formulating a linear regression model, as it can determine the appropriate estimation method in accordance with various embodiments of the present invention.

In some embodiments, a fitted linear regression model can be used to identify the relationship between a single predictor variable $x_j$ and the response variable y when all the other predictor variables in the model are held fixed. Specifically, the interpretation of $\beta_j$ can be the expected change in y for a one-unit change in $x_j$ when the other covariates are held fixed (e.g., the expected value of the partial derivative of y with respect to $x_j$). This can be referred to as the unique effect of $x_j$ on y. In contrast, in some embodiments, the marginal effect of $x_j$ on y can be assessed using a correlation coefficient or simple linear regression model relating only $x_j$ to y (e.g., this effect is the total derivative of y with respect to $x_j$) in accordance with aspects of the present invention.

In block 306, current and/or forecasted battery-external factors can be received as input, and a battery temperature can be predicted in block 308 based on the relative model and the current/future forecasted battery-external factors, as described above. In some embodiments, the battery temperature can be predicted in block 308 based on the model built in block 304 and forecasted weather conditions, estimated driving modes, and a vehicle mode in accordance with aspects of the present invention, as described in further detail herein below with reference to FIG. 4.

Referring now to FIG. 4, a high-level graph 400 showing predicted battery temperature for a battery in a vehicle (e.g., electric, hybrid electric, etc.) under any of a plurality of driving modes/operating conditions in accordance with various embodiments of the present invention. As described above with reference to FIG. 3, a generalized linear model (GLM) can be employed for predicting internal battery temperature for a vehicle in accordance with various embodiments of the present invention. The graph 400 shows an exemplary representation of predicting battery temperature by training a GLM model using received input (e.g., historical data, sensor measurements, manufacturer specifications, driving modes, etc.), which can be represented as x 402 in the graph 400. In some embodiments, parameters which can be input for battery temperature determination can be represented as $X_i$, with exemplary correlated features such as the following:

$X_{i1}$: External Weather temperature (e.g., −50~+50)
$X_{i2}$: External Weather Type (e.g., 0~N, 0—sunny, 1—cloudy, . . . )
$X_{i3}$: . . .
$X_{i4}$: Driving speed (e.g., 0~160 KM/H)
$X_{i5}$: Driving behaviors (e.g., 0~N, 0—aniouxAccelerate, 1—harshBrake, . . . )
$X_{i6}$: . . .
$X_{i7}$: vehicle type (e.g., 0~N)
$X_{i8}$: vehicle keep warm (0—not keep, 1—keep)
$X_{i9}$ The output $Y_i$ 402 can indicate an estimated battery temperature (e.g., −50~+50) for the input parameters for a particular battery, as shown in the graph 400. In accordance with various embodiments of the present invention, the GLM model trained with the input parameters as illustratively depicted as the graph 400, can be represented as $y=X\beta+\varepsilon$, as described in further detail above with reference to FIG. 3. In various embodiments, when using a linear regression GLM model in accordance with aspects of the present invention, the observations 406 can be assumed to be a result of random deviations 408 from an underlying relationship 410 between a dependent variable (e.g., y 404) and an independent variable (e.g., x 402).

Referring now back to FIG. 3, in block 310, a battery power capacity (e.g., discharge capacity) can be determined based on the predicted battery temperature from block 308, input manufacturer battery specifications, and/or experimental results for different battery types, and vehicle power consumption data can be received/acquired as input in block 312 using one or more sensors in accordance with aspects of the present invention. In block 314, endurance mileage (e.g., driving range distance) can be determined for an electric/hybrid electric vehicle based on the estimated battery temperature, vehicle power consumption data, determined battery capacity, user preferences, and/or manufacturers battery specifications in accordance with various embodiments. In various embodiments, discharge capacity can be represented in terms of the unit, ampere hour (A·h), and the endurance mileage (e.g., remaining driving range distance) can be calculated in block 314 as follows:

endurance time (hour)=(Discharge capacity (A·h))/ (Electric current (ampere)) (1)

endurance mileage (km)=(vehicle speed (km/hour))· (endurance time (hour)) (2)

The determined endurance mileage can be output to a real-time controller in block 316 configured for adjusting vehicle settings for a desired/optimal/maximum endurance mileage (e.g., driving range distance) and performance for the vehicle in accordance with various embodiments of the present invention.

Referring now to FIG. 5, a block/flow diagram showing a method 500 for maximizing electric vehicle driving range by adjusting vehicle functions based on a contextual charging driving range prediction for an electric/hybrid electric vehicle and/or user preferences is illustratively depicted in accordance with an embodiment of the present invention.

In various embodiments, historical battery temperature, historical, current, and/or expected future battery-external factors, and/or user preferences can be received and/or acquired as input in block 502, and an expected endurance mileage (e.g., driving distance range) for a vehicle can be determined based on vehicle power consumption data, determined battery power capacity, and/or input user preferences in block 504 in accordance with aspects of the present invention, as described in further detail above with reference to FIG. 3. In block 506, an expected endurance mileage can be output to a real-time controller, and in block 508, vehicle operations (e.g., acceleration, air conditioning, lighting, etc.) can be controlled based on the vehicle modes/setting determined to provide the expected/desired endurance mileage in accordance with aspects of the present invention. For example, in various embodiments, the real time controller can be configured for adjusting vehicle settings and/or functions (e.g., turn air conditioning/heat on/off, adjust acceleration/braking rate, turn lights on/off; disable particular vehicle/engine functions, etc.) to achieve a desired/optimal endurance mileage and performance for the vehicle based on user preferences and the determined endurance mileage for particular vehicle settings in accordance with aspects of the present invention.

In block 510, current and/or expected future battery-external factors can be iteratively detected/acquired in real-time (e.g., during operation of a vehicle) as input, and an updated expected endurance mileage can be determined and output to a real time controller, in a similar manner as described in blocks 502, 504, and 506, in accordance with various embodiments of the present invention. In block 512, vehicle operations (e.g., acceleration, deceleration, air conditioning, lighting, etc.) can be adjusted and controlled based on the vehicle modes/settings determined to achieve the updated expected endurance mileage in accordance with various embodiments of the present invention.

Figure 6:
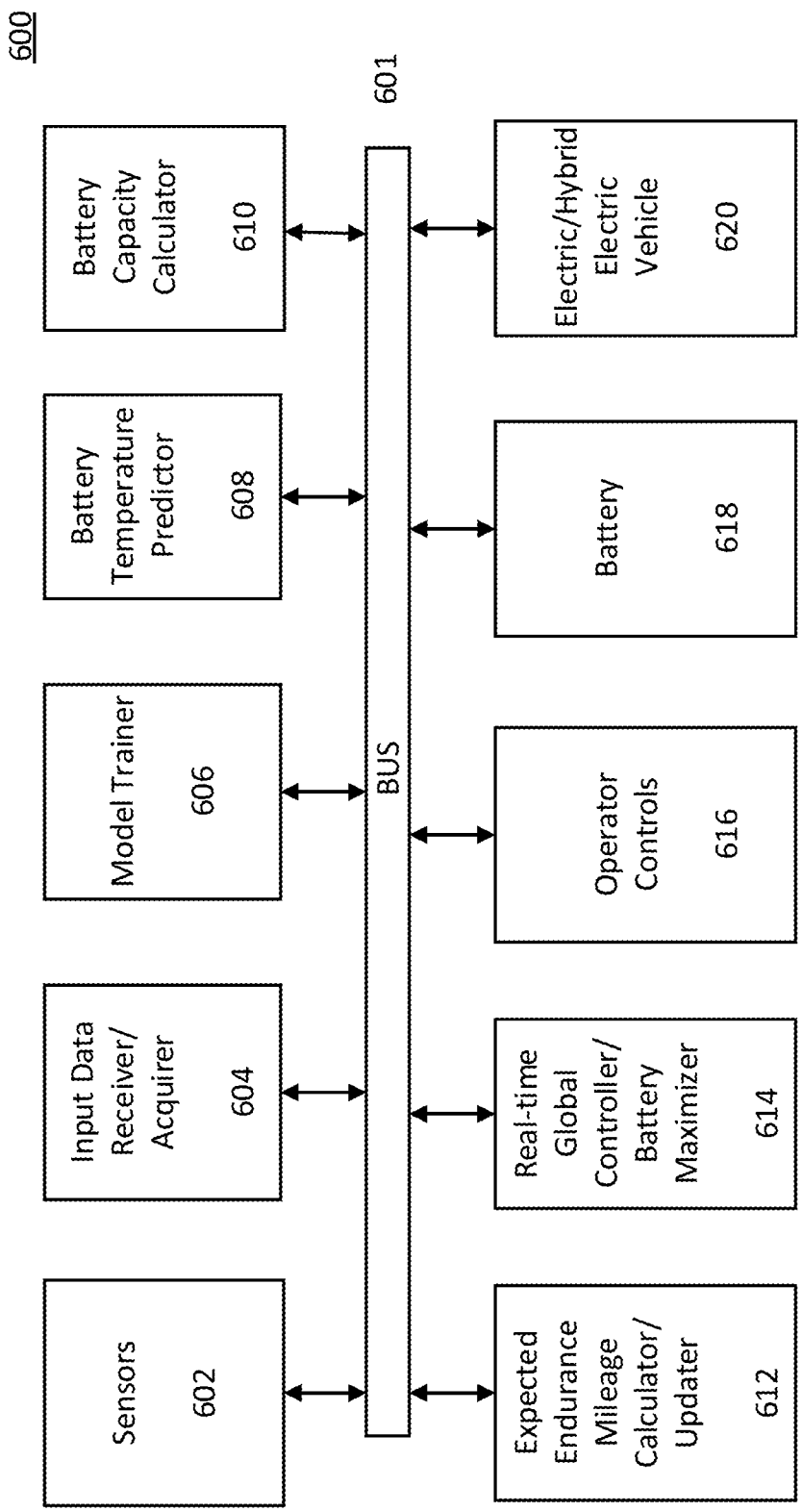
FIG. 6 is a block/flow diagram showing a system for maximizing electric vehicle driving range by adjusting vehicle functions based on a contextual charging driving range prediction for an electric/hybrid electric vehicle and/or user preferences, in accordance with an embodiment of the present invention.

Referring now to FIG. 6, a block/flow diagram showing a system 600 for maximizing electric vehicle driving range by adjusting vehicle functions based on a contextual charging driving range prediction for an electric/hybrid electric vehicle and/or user preferences is illustratively depicted in accordance with an embodiment of the present invention In various embodiments, sensors 602 (e.g., speed, temperature, weather, battery level, etc.) can be deployed in/on a vehicle 620 (e.g., electric, hybrid electric, etc.) for sensing any of a plurality of vehicle functions, external conditions, and/or functions/status of a battery 618, and the vehicle can be controlled using operator controls 616 (e.g., manual or automatic controls) in accordance with aspects of the present invention. An input data receiver/acquirer 604 can receive and/or acquire data (e.g., historical data, sensor data, weather data, etc.), and a model trainer 606 can be employed in conjunction with a battery temperature predictor 608 configured for determining an estimated current/future battery temperature and a battery capacity calculator 610 configured for determining a current/future battery capacity in accordance with various embodiments of the present invention.

An expected endurance mileage calculator/updater 612 can determine an estimated driving range distance for a battery 618 in a vehicle 620 before and/or during operation of the vehicle 620 in accordance with various embodiments of the present invention. A real-time global controller/battery maximizer 614 can adjust vehicle 620 operations (e.g., acceleration, deceleration, air conditioning, lighting, etc.) to achieve a desired/optimal endurance mileage and performance for the vehicle based on user preferences and the determined endurance mileage for particular vehicle settings in accordance with various embodiments of the present invention.

Figure 7:
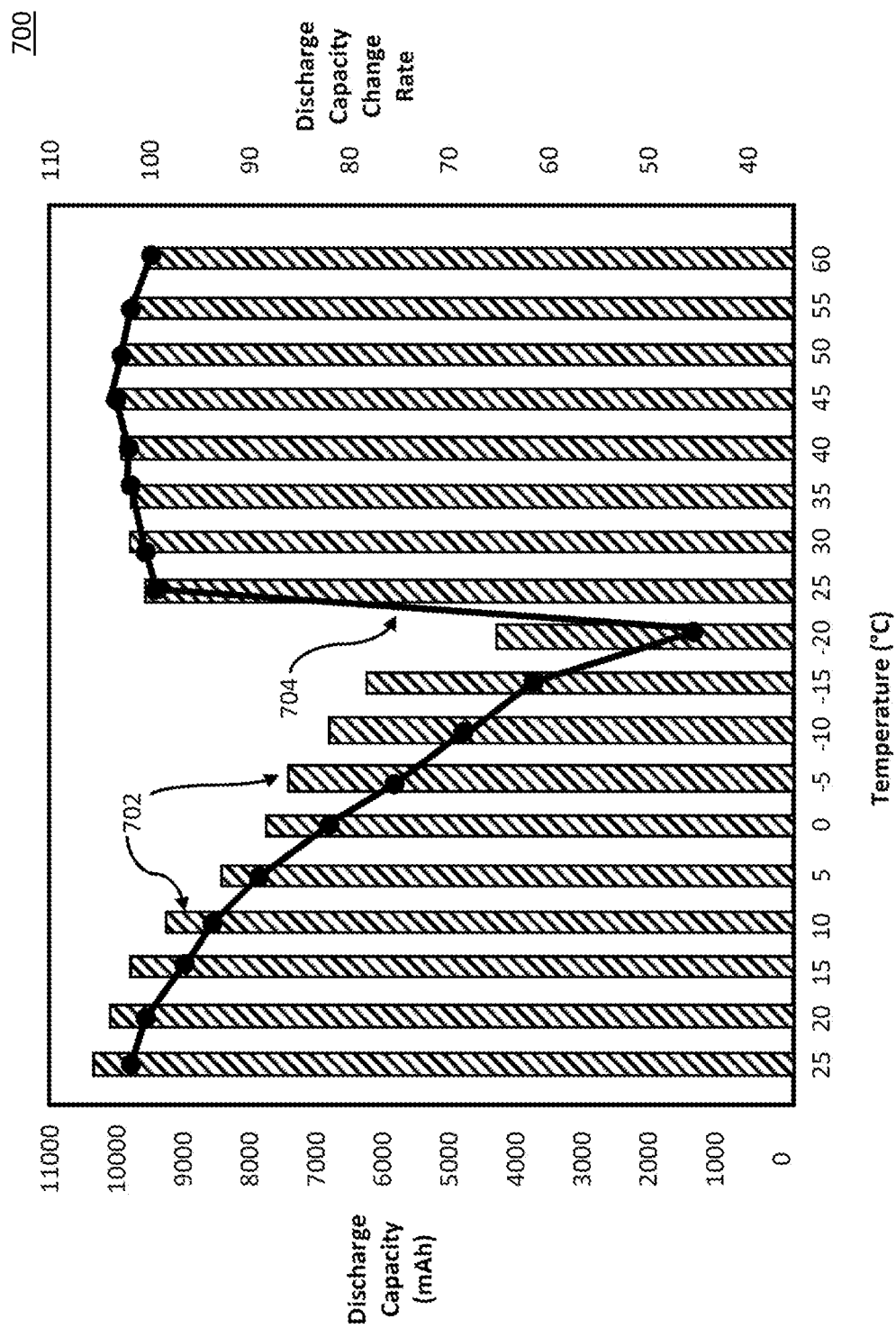
FIG. 7 is a graph showing discharge capacity and discharge capacity change rate at varying battery temperatures for an exemplary a lithium iron phosphate battery, in accordance with an embodiment of the present invention.

Referring now to FIG. 7, a graph 700 showing discharge capacity 702 and discharge capacity change rate 703 at a plurality of different battery temperatures for an exemplary lithium iron phosphate battery is illustratively depicted in accordance with an embodiment of the present invention. It is to be appreciated that aspects of the present invention can be applied to any type of battery in accordance with various embodiments, and the experimental results shown for lithium iron phosphate in the graph 700 are presented for illustrative purposes. In some embodiments, manufacturers battery specifications can be utilized as input for determining a discharge capacity/change rate for different battery temperatures in accordance with aspects of the present invention. The data represented in the graph 700 is summarized in Table 1 below:

TABLE 1

Lithium Iron Phosphate Experimental Results:

| Battery Temperature (° C.) | Discharge Capacity (mAh) Average | Discharge Capacity Change Rate | |
|---|---|---|---|
| | | Rate | % |
| 25 | 10217.9 | 100 | 0.0 |
| 20 | 10098.7 | 98.8 | −1.2 |
| 15 | 9840.4 | 96.3 | −2.5 |
| 10 | 9381.5 | 91.8 | −4.5 |
| 5 | 8743.3 | 85.6 | −6.2 |
| 0 | 8099.8 | 79.3 | −6.3 |
| −5 | 7344.5 | 71.9 | −7.4 |
| −10 | 6783.8 | 66.4 | −5.5 |
| −15 | 6038.8 | 59.1 | −7.3 |
| −20 | 4450.1 | 43.6 | −15.6 |
| 25 | 9643.8 | 100.0 | 0.0 |
| 30 | 9634.8 | 102.0 | 2.0 |
| 35 | 9937.4 | 103.0 | 1.1 |
| 40 | 9943.3 | 103.1 | 0.1 |
| 45 | 9948.8 | 103.2 | 0.1 |
| 50 | 9945.0 | 103.1 | 0.0 |
| 55 | 9917.3 | 102.8 | −0.3 |
| 60 | 9690.3 | 100.5 | −2.4 |

In various embodiments, the data shown in Table 1 and in the graph 700 can be received as input and utilized as a reference table to get specific "discharge capacity" of any of a plurality of particular batteries/battery types (e.g., different sizes, manufacturers, etc.) in any of a plurality of different temperatures in accordance with aspects of the present invention. The discharge capacity can indicate the actual discharge capacity of battery at particular temperatures, while battery capacity can indicate a theoretical capacity at a specific temperature (e.g. base temperature of 25) in accordance with aspects of the present invention. In some embodiments, discharge capacity change rate can be represented as (discharge capacity/theoretical capacity of battery), and a theoretical capacity can be equal to the discharge capacity on 2 bases (e.g., bases for low temperature and high temperature), which in the graph 700 can be represented as 25 in accordance with various embodiments of the present invention.

Embodiments of the present invention can be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for dynamic driving range prediction for electric vehicles (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for controlling operation of a vehicle based on estimating battery-powered driving distance for the vehicle, comprising:
    predicting a future battery temperature based on a trained relative model and one or more of current or future battery-external factors, the relative model being trained using input historical battery temperature data and historical battery-external factors;
    iteratively determining battery power capacity during operation of the vehicle based on a current measured battery temperature, the predicted future battery temperature, and input manufacturer specifications for the battery;
    calculating a remaining battery powered driving distance based on input vehicle power consumption data and the determined battery power capacity; and
    automatically iteratively adjusting one or more of a plurality of vehicle power consumption settings during the operation of the vehicle based on the input vehicle power consumption data and the determined battery power capacity responsive to a user-selected battery-powered driving distance threshold.

2. The method as recited in claim 1, wherein the historical battery-external factors include historical external weather conditions, driving modes, and vehicle power consumption settings.

3. The method as recited in claim 1, wherein the future battery-external factors include forecasted external weather conditions, estimated driving modes, and selected vehicle power consumption settings.

4. The method as recited in claim 3, wherein the selected vehicle power consumption settings are selected by a user from a group consisting of an acceleration speed, braking speed, lighting levels, air conditioning levels, heating levels, and entertainment system settings.

5. The method as recited in claim 1, wherein the relative model is a generalized linear model (GLM).

6. The method as recited in claim 1, further comprising increasing the remaining battery-powered driving distance by the adjusting, using a real-time controller, the one or more of the plurality of vehicle power consumption settings based on the input vehicle power consumption data and the determined battery power capacity.

7. The method as recited in claim 1, further comprising automatically adjusting the one or more of a plurality of selected vehicle power consumption settings during the operation of the vehicle using a real-time controller, the real-time controller being configured for automatically adjusting vehicle settings based on the user-selected battery-powered driving distance threshold and user-selected performance mode settings for the vehicle.

8. A system for controlling operation of a vehicle based on estimating battery-powered driving distance for the vehicle, comprising:
  a processor device operatively coupled to a memory, the processor device being configured to:
    predict, using a battery temperature predictor, a future battery temperature based on a trained relative model stored in the memory, and one or more of current or future battery-external factors, the relative model being trained using input historical battery temperature data and historical battery-external factors;
    iteratively determine battery power capacity during operation of the vehicle based on a current measured battery temperature, the predicted future battery temperature, and input manufacturer specifications for the battery;
    calculate, using an endurance mileage calculator, a remaining battery powered driving distance based on input vehicle power consumption data and the determined battery power capacity, and
    automatically iteratively adjust one or more of a plurality of vehicle settings during the operation of the vehicle based on the input vehicle power consumption data and the determined battery power capacity responsive to a user-selected battery-powered driving distance threshold.

9. The system as recited in claim 8, wherein the historical battery-external factors include historical external weather conditions, driving modes, and vehicle power consumption settings.

10. The system as recited in claim 8, wherein the future battery-external factors include forecasted external weather conditions, estimated driving modes, and selected vehicle power consumption settings.

11. The system as recited in claim 10, wherein the selected vehicle power consumption settings are selected by a user from a group consisting of an acceleration speed, braking speed, lighting levels, air conditioning levels, heating levels, and entertainment system settings.

12. The system as recited in claim 8, wherein the relative model is a generalized linear model (GLM).

13. The system as recited in claim 8, further comprising a controller configured to increase the remaining battery-powered driving distance by adjusting a plurality of selected vehicle power consumption settings based on the input vehicle power consumption data and the calculated battery power capacity.

14. The system as recited in claim 8, further comprising a real-time controller configured to automatically adjust the one or more of a plurality of selected vehicle power consumption settings during the operation of the vehicle, the real-time controller being configured for automatically adjusting vehicle settings based on the user-selected battery-powered driving distance threshold and user-selected performance mode settings for the vehicle.

15. A non-transitory computer readable storage medium comprising a computer readable program for controlling operation of a vehicle based on estimating battery-powered driving distance for the vehicle, wherein the computer readable program when executed on a computer causes the computer to perform the steps of:
  predicting a future battery temperature based on a trained relative model and one or more of current or future battery-external factors, the relative model being trained using input historical battery temperature data and historical battery-external factors;
  iteratively determining battery power capacity during operation of the vehicle based on a current measured battery temperature, the predicted future battery temperature, and input manufacturer specifications for the battery;
  calculating a remaining battery powered driving distance based on input vehicle power consumption data and the determined battery power capacity; and
  automatically iteratively adjusting one or more of a plurality of vehicle settings during the operation of the vehicle based on the input vehicle power consumption data and the determined battery power capacity responsive to a user-selected battery-powered driving distance threshold.

16. The non-transitory computer-readable medium as recited in claim 15, wherein the historical battery-external factors include historical external weather conditions, driving modes, and vehicle power consumption settings.

17. The non-transitory computer-readable medium as recited in claim 15, wherein the future battery-external factors include forecasted external weather conditions, estimated driving modes, and selected vehicle power consumption settings.

18. The non-transitory computer-readable medium as recited in claim 17, wherein the selected vehicle power consumption settings are selected by a user, the selected vehicle power consumption settings comprising one or more of an acceleration speed, braking speed, lighting levels, air conditioning levels, heating levels, and entertainment system settings.

19. The non-transitory computer-readable medium as recited in claim 15, further comprising increasing the remaining battery-powered driving distance by adjusting, using a real-time controller, one or more of a plurality of selected vehicle power consumption settings based on the input vehicle power consumption data and the calculated battery power capacity.

20. The non-transitory computer-readable medium as recited in claim 15, further comprising automatically adjusting the one or more of a plurality of selected vehicle power consumption settings during the operation of the vehicle using a real-time controller, the real-time controller being configured for the automatically adjusting the one or more of a plurality of vehicle power consumption settings based on the user-selected battery-powered driving distance threshold and user-selected performance mode settings for the vehicle.

* * * * *